June 30, 1953  G. C. PAXTON  2,643,377
NAILING MECHANISM FOR ASSEMBLED CRATE HEADS
Filed Feb. 12, 1951  5 Sheets-Sheet 5

INVENTOR
G. C. Paxton
BY
ATTORNEYS

Patented June 30, 1953

2,643,377

UNITED STATES PATENT OFFICE 2,643,377

NAILING MECHANISM FOR ASSEMBLED CRATE HEADS

Gerald C. Paxton, Sanger, Calif., assignor to General Nailing Machine Corporation, Sanger, Calif., a corporation of California Application February 12, 1951, Serial No. 210,458

8 Claims. (Cl. 1—8.1)

This invention relates generally to improvements in box or crate making machines, and is a continuation in part of application Serial No. 81,347, filed March 14, 1949.

The present invention has for one object the provision of a novel mechanism for substantially simultaneously power nailing together the component parts of a box part, such as a crate end or head comprised of a rigid frame having spaced panels affixed thereto.

Another object of the invention is to provide a nailing mechanism, for the purpose described, which is arranged to function without any substantial spacing, in the direction of travel, of the assembled crate heads; the mechanisms heretofore known having required wide spacing between adjacent ones of the assembled crate heads to permit the spike driving chuck units to move—in timed relation—into such spaces to drive the spikes which secure the parts of each crate head frame together.

A further object of the invention is to provide a nailing mechanism, as in the preceding paragraph, wherein each assembled but unnailed crate head is depressed, at a predetermined point, below the normal path of travel; the crate head, as so depressed, then being disposed between spike driving chuck units mounted in position to work below and clear of said path. Thus, other than reciprocating in part in spike driving relation, said chuck units have no other movement, and the structure is simplified.

An additional object of the invention is to provide novel actuating connections between the top driving bar of the machine, and the spike driving chuck units which work, as aforesaid, below the normal path of travel of the assembled crate heads.

It is also an object of the invention to provide a nailing mechanism, for assembled crate heads, which is adapted to readily and conveniently mount, as an attachment, to a nailing machine of the type which includes transversely spaced, vertically slotted posts, and a power reciprocated top driving bar working in guided relation in said posts.

A further object of the invention is to provide a practical and reliable nailing mechanism, and one which will be exceedingly effective for the purpose for which it is designed.

These objects are accomplished by means of such structure and relative arrangement of parts as will fully appear by a perusal of the following specification and claims.

Figure 1:
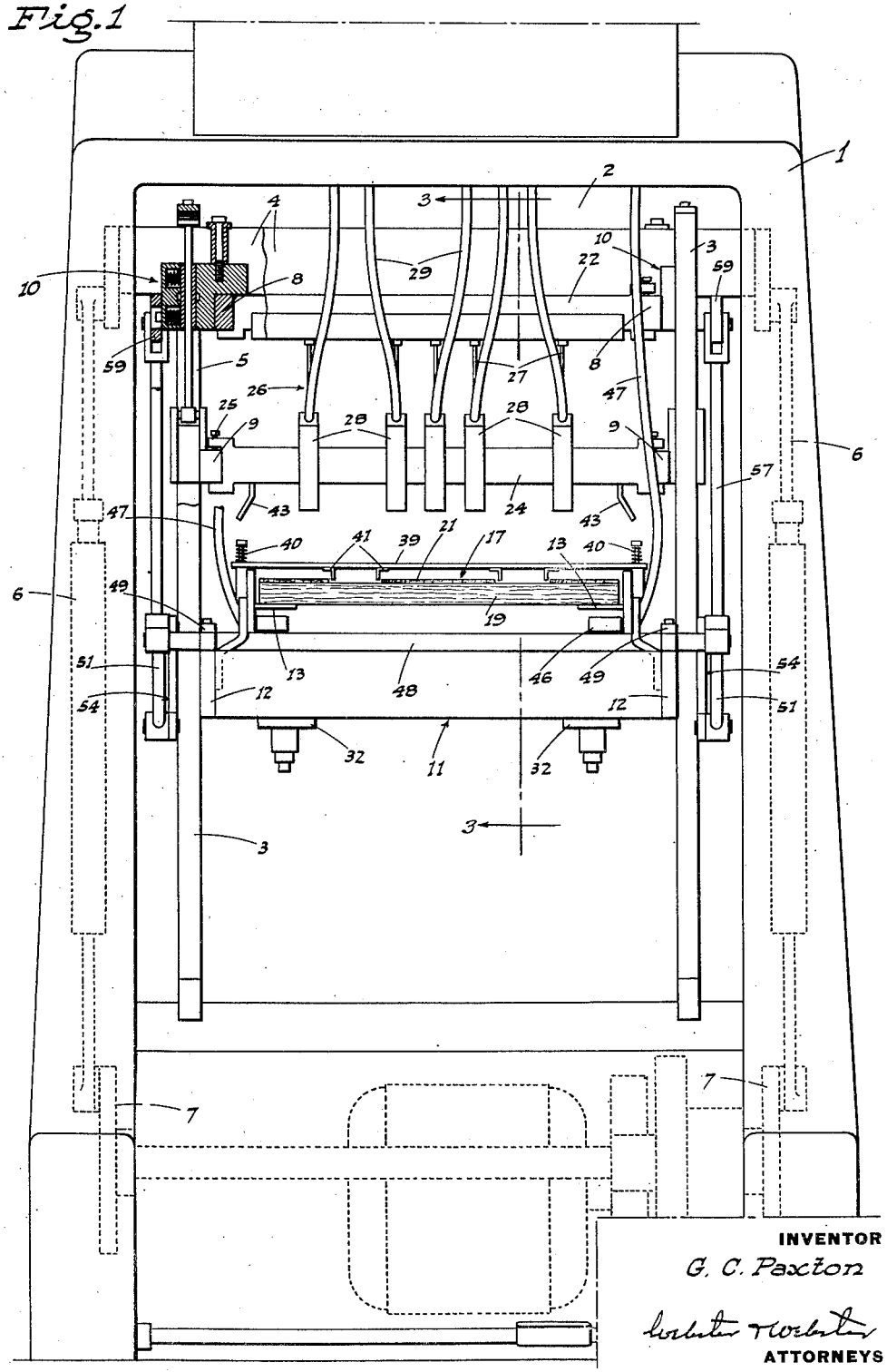
Fig. 1 is a feed-in end elevation of a nailing machine showing the improved nailing mechanism incorporated therein.

Referring now more particularly to the characters of reference on the drawings, the present nailing mechanism is adapted to be mounted, preferably as an attachment or conversion structure, to a nailing machine which is preferably of the type shown in U. S. Patent No. 2,488,757, dated November 22, 1949. Such machine comprises an upstanding supporting end housing structure or frame, indicated generally at 1, and outlining a rectangular opening 2 in which the box making parts of the machine are mounted. Mounted on the housing within this opening is a pair of transversely spaced heavy duty upstanding posts 3.

A horizontal transverse top driving bar 4 extends between the posts for vertical reciprocation, said posts being vertically slotted, as at 5, and the end portions of the bar 4 extending through the slots in guided relation and into the sides of the housing 1 which are hollow. At its ends the bar is connected, as is conventional in box making machines, to a power reciprocating means which in this particular machine comprises depending connecting rods 6 connected at their lower end on motor driven cranks 7, as shown in said patent.

Secured in fixed connection with bar 4, also as shown in said patent, are horizontal longitudinally extending bars 8 disposed close to the posts 3, while below the bars 8, and mounted on said posts 3 for sliding movement relative to the driving bar 4 and bars 8, are similarly disposed bars 9.

The bars 8 and 9 on which the nailing units are mounted are yieldably tied together, as is common in box making machines, in such a manner that with the initial downward movement of the driving bar 4, the bars 8 and 9 move together without relative movement therebetween, and then the bars 8 move down relative to the bars 9.

Upon the upward stroke of the driving bar 4 the bars 8 and 9 first lift together as a unit and the bars 8 then pull away from the bars 9, restoring said bars 8 and 9 to their initial spaced apart position. The means for yieldably tying these bars together is denoted generally at 10, and such means in the present case is that shown and described in full in my patent, No. 2,530,626, dated November 21, 1950.

The above features are now standard in nailing machines of the above type, and of themselves form no part of the present invention. Ordinarily, however, the bars 8 and 9 directly support the nailing rods and chucks respectively, of the nailing units for longitudinal nailing operations.

In the present case, however, transverse nailing is desired, and, therefore, the nailing units are differently arranged, as will be seen later.

The present invention comprises—in combination with the above structure—the following:

Numeral 11 indicates generally a horizontal longitudinal frame which extends through opening 2 below bars 9 to a termination some distance beyond opposite ends of the housing 1, such frame 11 including transversely spaced side beams 12, each suitably secured intermediate its ends to the corresponding post 3 by means including bolts B.

The beams 12 on the feed-in end of the machine carry a work support for the parts to be assembled, which comprises transversely spaced and facing angle-ledges 13.

At the discharge end of the machine, the beams 12 support a crate head carry-off unit 14 which includes the platform elements 15 followed by a plurality of transverse rollers 16. A substantial space is left between adjacent ends of the ledges 13 and the unit 14 for a reason which will shortly appear.

The ledges 13 form the means on which to assemble the parts of an unnailed crate head 17, and shift such parts in assembled order onto a platen assembly, indicated generally at 18. This platen assembly is disposed in the space between the ledges 13 and unit 14 with the upper surfaces of said assembly normally alined with the work supporting surfaces of the ledges 13 and unit 14.

Each assembled but unnailed crate head 17 includes a frame which is elongated transversely of the direction of travel through the machine and comprises spaced parallel rails 19 having end posts 20 extending between the end portions of said rails. Additionally, each crate head 17 includes, on the frame thereof, a plurality of slats or panels 21 extending lengthwise of the direction of travel and spaced transversely thereof.

The assembled but unnailed crate heads are shoved or advanced by suitable means in successive order from the ledges 13 onto the platen assembly 18, and it is the purpose of the present invention to drive spikes through the end portions of the rails 19 into the ends of the posts 20 whereby to bind the crate head frame together and to simultaneously nail the panels 21 to said frame.

This result is accomplished after delivery of each assembled but unnailed crate head 17 onto the platen assembly 18, by means of the following arrangement of nailing chuck gangs and spike driving chuck units.

A pair of spaced transverse top mounting bars 22 span between, and are secured at their ends to, corresponding ones of the upper cross bars 8, by means of C-clamps 23.

A corresponding pair of spaced transverse bottom mounting bars 24 span between, and are secured to, corresponding ones of the lower cross bars 9 by means of C-clamps 25.

Figure 4:
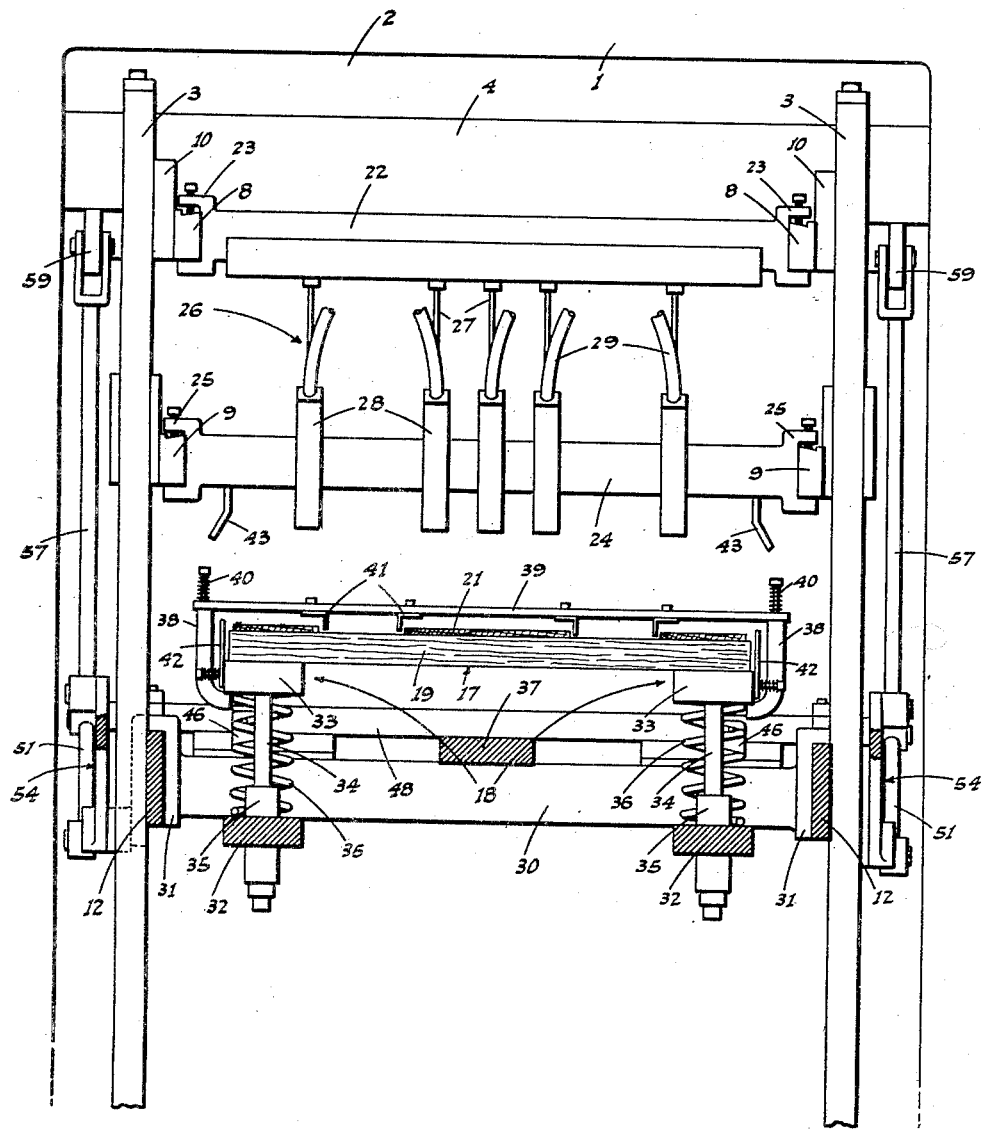
Fig. 4 is a cross section of the nailing mechanism on line 4—4 of Fig. 2.

Nailing units or devices, indicated generally at 26, are mounted in connection with corresponding ones of the top mounting bars 22 and bottom mounting bars 24; each such nailing unit including nailing rods 27 fixed on, and depending from, the top mounting bar 22, and nailing chucks 28 fixed on and projecting below the bottom mounting bar 24, and forming a gang. The nailing rods 27 work in corresponding nailing chucks 28 to drive nails from the latter; such nails being fed to the chucks by flexible tubes 29 which receive nails from a conventional shaker-type nail stripping device on housing 1. The nailing units 26 are initially in raised position, as in Figs. 1, 2 and 4.

The depressible platen assembly 18, upon which each assembled crate head 17 is deposited for nailing, comprises the following structural arrangement:

A pair of longitudinally spaced, transverse beams 30 extend between the side beams 12 on opposite sides of the upstanding posts 3; such transverse beams 30 being affixed, at the end, by saddles 31, to said side beams 12. A pair of longitudinal, transversely spaced beams 32 extend between the beams 30 and are fixed to the bottom thereof.

Above the transverse beams 30, and in corresponding alinement with the beams 32, the platen assembly includes longitudinal, depressible anvils 33, each of the latter being fixed at the end with a dependent guide rod 34 which runs through a guide sleeve 35 on the adjacent beam 32. Heavy-duty compression springs 36 are engaged between corresponding beams 32 and anvils 33, yieldably resisting downward motion of the latter.

A fixed longitudinal anvil 37 extends between, and is secured on top of, the transverse beams 30 intermediate, but normally below, the depressible anvils 33.

Figure 3:
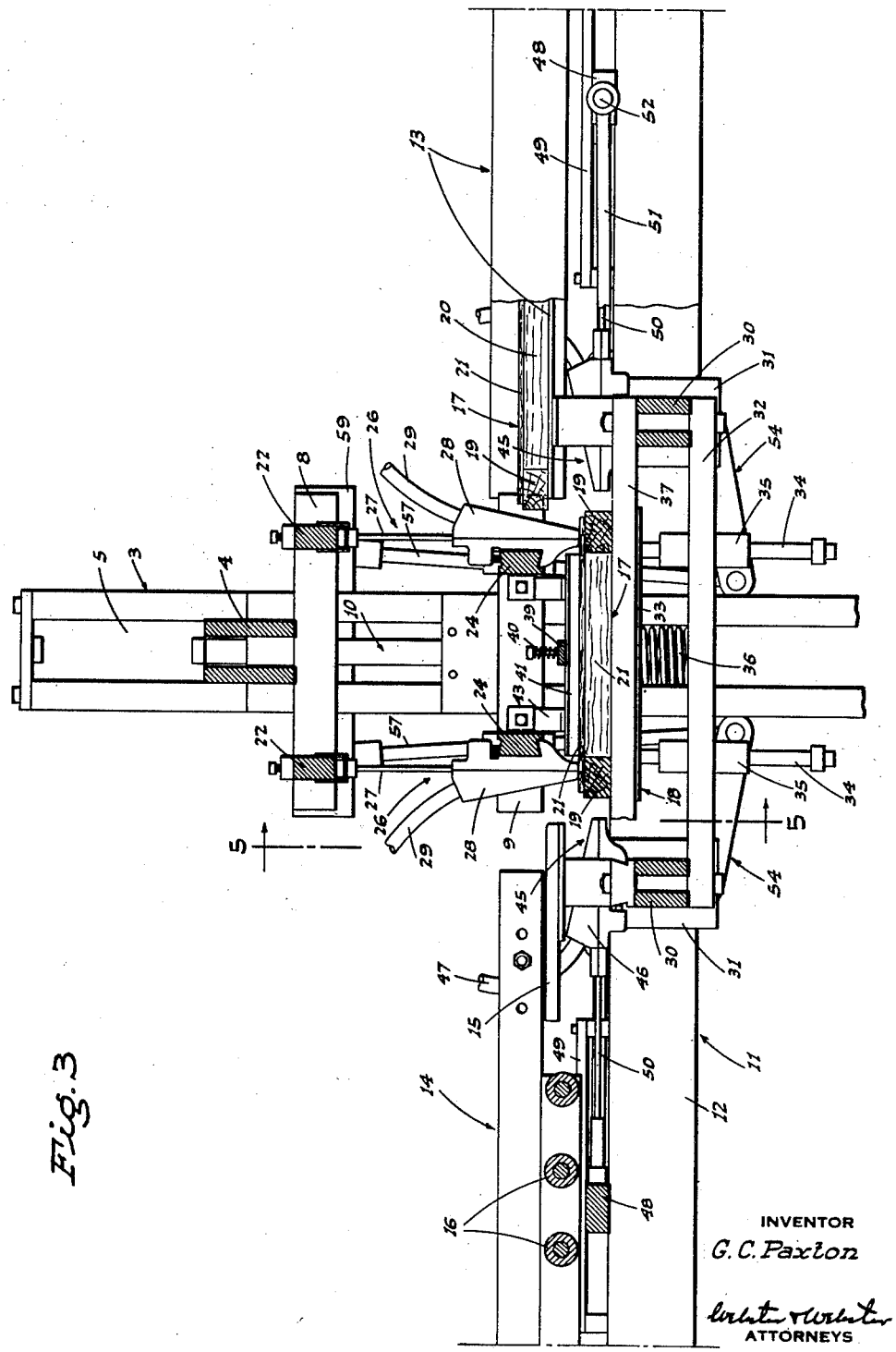
Fig. 3 is a sectional elevation of the nailing mechanism, taken on line 3—3 of Fig. 1, showing the platen assembly—with an assembled crate head thereon—as depressed by downward movement of the nailing chuck units, but before the nailing rods of the latter or said spike driving units are actuated.
Figure 5:
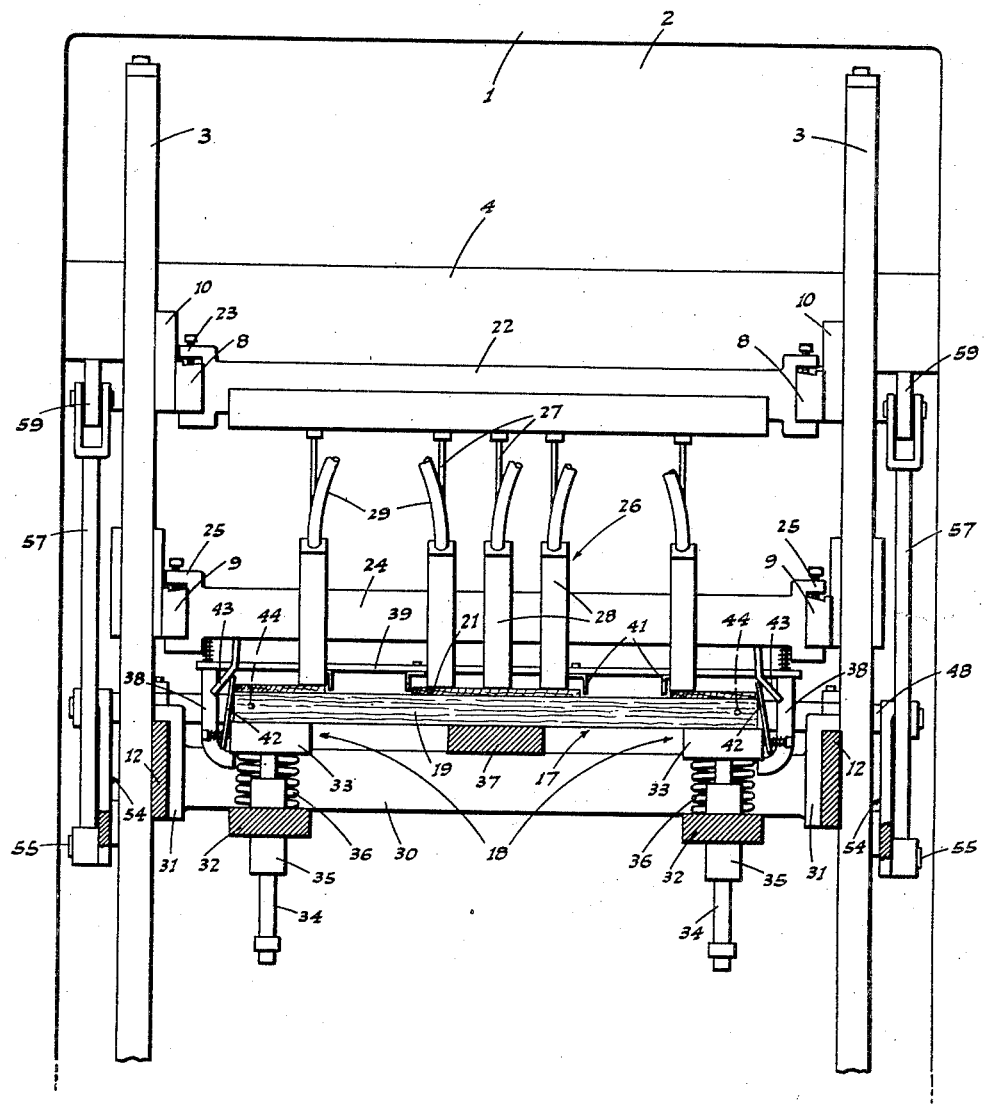
Fig. 5 is a cross section of the nailing mechanism on line 5—5 of Fig. 3.

With each downward stroke of the top driving bar 4, the nailing chucks 28 of the nailing units 26 first engage opposite end portions of the panels 21 of the assembled crate head resting on the platen assembly 18, and depress such crate head and the platen assembly until the crate head bears against the fixed anvil 37. (See Figs. 3 and 5.) This stops downward motion of the nailing units 26 and the bottom mounting bars 24. With continued downward motion of the top driving bar 4 to complete its downward stroke, the nailing rods 27 are driven through the chucks 28 whereby to drive nails through the panels 21 into the crate head frame.

The panels 21 are maintained in proper position on the platen supported crate head as follows:

Supporting arms 38 upstand from the sides of and are welded to the depressible anvils 33 intermediate the ends and at the bottom thereof, and a horizontal, transverse strip-like plate 39 extends between the upper ends of said supporting arms 38; being secured to the latter in yieldable manner by spring connections 40. Horizontal guide flanges 41 depend from the plate 39 in locating relation to said panels 21. See Fig. 4.

Additionally, the depressible anvils 33 are fitted, on their outer edges, with upstanding, laterally deflectible flushing plates 42, which flushing plates are urged laterally inwardly with each downward motion of the nailing units 26, by means of cams 43 carried at appropriate points on the bottom mounting bars 24. These flushing plates 42 when swung laterally inwardly (see Fig. 5) serve to automatically and properly aline the posts and rails relative to each other, and to the endmost panels 21.

At substantially the same time that the nailing units 26 nail the panels 21 on the frame of each crate head 17 on the platen assembly 18, the following described spike driving units act—in predetermined timed relation, and in response to the downward stroke of the top driving bar 4—to drive spikes through the end portions of the rails into the ends of the posts, as at 44.

The transverse beams 12 are each fitted, on top thereof, with a spike driving unit, indicated generally at 45; each of said units including a pair of transversely spaced chucks 46 facing toward the platen assembly 18, but disposed in a plane below the normal position of the latter. Spikes are fed to the chucks 46 by tubes 47 which lead from the shaker-type nail stripping device.

Outwardly of the chucks 46 each spike driving unit 45 includes a cross head 48 which rides on, and extends between, the side beams 12 of frame 11; opposite ends of each such cross head 48 being carried in a guideway 49. Nailing rods 50 are fixed to each cross head 48 and project into the corresponding chucks 46.

Figure 2:
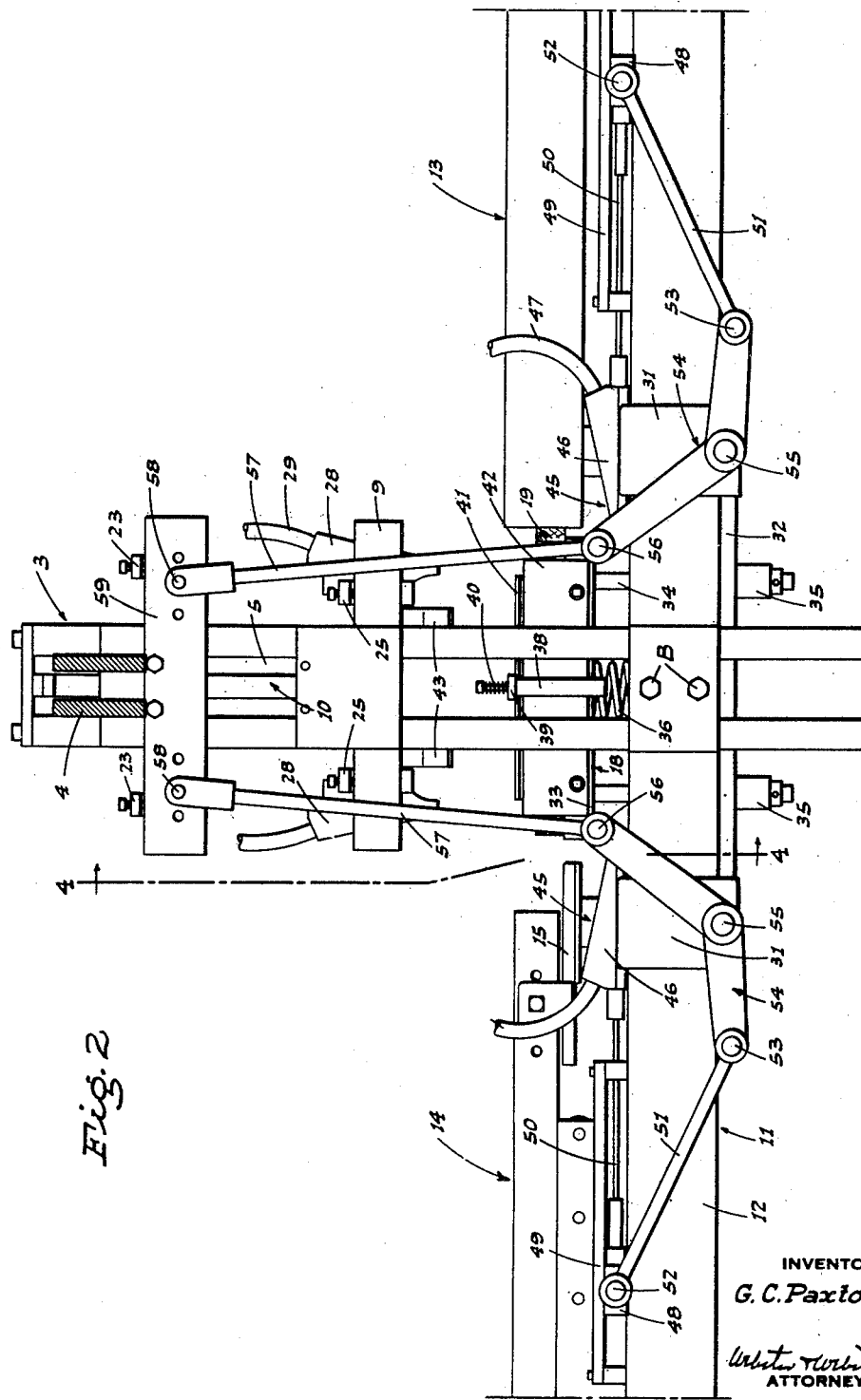
Fig. 2 is a side elevation of the nailing mechanism with the parts shown in starting position.

Referring particularly to Fig. 2, links 51 are pivotally connected at one end, as at 52, to opposite ends of each of the cross heads 48, and said links thence extend longitudinally toward posts 3 to pivotal connection, as at 53, with bellcrank levers 54 journaled, as at 55, to the outside of corresponding ones of the saddles 31. The bellcrank levers 54 are pivoted, at the end opposite the pivots 53, as at 56, to the lower ends of upwardly extending actuating rods 57. The pair of rods 57 on each side of the machine are adjustably pivotally connected, as at 58, to a cross bar 59 affixed, outwardly of the corresponding post 3, to the top driving bar 4 for reciprocation with the latter. With each downward stroke of the top driving bar 4 and cross bars 59, the actuating rods 57 are thrust downwardly, resulting in action of the bellcrank levers 54, which advances the cross heads 48 toward each other, whereupon the nailing rods 50 are driven forcefully into the chucks 46. When this occurs spikes 44 are driven horizontally from said chucks 46 through the end portions of the rails 19 into the ends of the posts 20 of the crate head on the platen assembly 18 which is then depressed and in position for such operation; the platen assembly 18 having been depressed in the manner previously described.

After each nailing operation by the nailing units 26, and the spike driving chuck units 45, said units are all retracted to starting position upon the top driving bar 4 moving upwardly on its return stroke. This relieves the platen assembly 18 from the pressure thereon, and said platen assembly returns to its normal elevated position. When this occurs the next assembled but unnailed crate head 17 may be advanced from the supporting ledges 13 into the nailing mechanism, displacing the already nailed crate head onto the carry-off unit 14 for subsequent disposition.

It will thus be recognized that the described nailing mechanism functions smoothly, effectively, and positively for automatic power nailing of crate heads. With mounting of the spike driving chuck units below the plane of the work supports and that of the platen assembly in its normal elevated position, the spiking of the frame parts of crate heads is accomplished in a much more ready and facile manner than with previously known machines.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a machine for nailing assembled crate heads which consist of parallel side rails, parallel end posts and slats extending in spaced relation across the side rails, the combination of: a frame, a nailing unit mounted for vertical reciprocating movement on the frame and which unit includes a gang of spaced nailing devices, a horizontally disposed work support, a horizontally disposed platen supported in the frame below the nailing unit, means yieldably holding the platen with its top surface substantially flush with the top surface of the work support, said work support being disposed to enable an assembled crate head to be fed onto the platen, the nailing unit being operable upon downward movement thereof to press the platen downwardly, stop means to limit such movement of the platen, the nailing unit being then operable to effect nailing of the slats to the side rails, a spike driving unit disposed outwardly from each side of the platen and including a spike driving element mounted for horizontal movement and operatively connected with the vertically movable nailing unit to move in timed relation therewith an effective to move into engagement with the ends of the side rails of the crate head when the platen is in its lowered position and effect spiking of the side rails to the end posts.

2. A nailing machine for the purpose described comprising a supporting frame, a platen, yieldable means normally maintaining the platen top surface in a predetermined horizontal plane, a work support from which to feed a crate head onto the platen when in said normal position, a nailing unit mounted in the frame above the platen for vertical reciprocating movement, such chuck unit being engageable with a head on the platen to depress the head and platen upon downward movement of the nailing unit, stop means to limit such downward movement of the platen, the nailing unit being then operative to effect a nailing operation, a pair of spiking units mounted on opposite sides of the platen, each such unit including a horizontally movable spike driving element, a cross head slidably mounted in the frame and connected to the elements, links connected with the cross head, bell crank levers fulcrumed on the frame, the links being pivoted to one end of the bell crank levers, and other links pivoted to the other end of the levers and to the nailing unit; the bell crank and links being operative to effect operation of the nailing unit in timed relation to the movement of said elements so that the latter will effect a spiking operation simultaneously with the nailing operation of the nailing unit.

3. In a machine for nailing assembled crate heads which consist of parallel side rails, parallel end posts and slats extending in spaced relation across the side rails, the combination of: a horizontal platen to receive and support an assembled but initially unnailed crate head, means mounting the platen for downward movement to a predetermined low level from an initial head-receiving position, means acting on the platen to yieldably resist such downward movement, spike driving means on the machine positioned to spike the rails to the posts when the platen and head are in said low-level position, nailing means on the machine to nail the slats on the rails arranged and functioning to first bear down on and lower the head and platen and then drive the nails, and means controlled by such movement of the nailing means to actuate the spike driving means at the same time the nail driving is effected.

4. In a machine for nailing assembled crate heads which consist of parallel side rails, parallel end posts and slats extending in spaced relation across the side rails, the combination of: a horizontal platen to receive and support an assembled but initially unnailed crate head, means mounting the platen for downward movement to a predetermined low level from an initial head-receiving position, means acting on the platen to yieldably resist such downward movement, nailing means on the machine to nail the slats on the rails arranged and functioning to first bear down on and lower the head and platen and then drive the nails, and means functioning to spike the rails to the posts while the head and platen are in said low-level position.

5. A structure as in claim 4, in which the platen and platen-mounting means comprise a pair of longitudinal transversely spaced means rigid with the frame, transverse longitudinally spaced beams rigidly fixed to the bottom of the first named beams at substantially right angles thereto, spaced anvils disposed above and in substantial parallelism with the last named beams, and heavy compression springs interposed between the anvils and such last named beams.

6. A structure as in claim 5 including another anvil fixed to the top of the first named beams in substantial parallelism with the first named anvils and substantially midway between the vertical planes in which they lie.

7. A structure as in claim 5 including fingers fixed to the anvils at the outsides thereof and projecting above the top surfaces of such anvils, a transverse plate extending across the anvils and mounted on the fingers and yieldable vertically relative to the anvils, and guide flanges depending from the plate and effective to locate the panels of the crate head relative to the side rails of said head.

8. A structure as in claim 5 including yieldable flushing plates fixed to and upstanding from the sides of the anvils, and cam means on the chuck unit engageable with said flushing plates as the chuck unit lowers.

GERALD C. PAXTON.

References Cited in the file of this patent

UNITED STATES PATENTS

| Number | Name | Date |
|---|---|---|
| 1,576,213 | Parker | Mar. 9, 1926 |
| 1,939,985 | Keech | Dec. 19, 1933 |
| 1,963,377 | Paxton | June 19, 1934 |